US006788964B1

(12) United States Patent
Satomura et al.

(10) Patent No.: US 6,788,964 B1
(45) Date of Patent: Sep. 7, 2004

(54) MOBILE UNIT COMMUNICATION APPARATUS

(75) Inventors: Masashi Satomura, Saitama (JP); Ken Asami, Saitama (JP); Hirotatsu Tsuchida, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/558,073

(22) Filed: Apr. 26, 2000

(30) Foreign Application Priority Data

Apr. 28, 1999 (JP) .......................................... 11-121626

(51) Int. Cl.[7] ................................................ H04Q 7/20

(52) U.S. Cl. ...................... 455/575.9; 455/96; 701/208; 340/902; 340/990

(58) Field of Search .......................... 455/73, 456, 457, 455/96, 95, 99, 113, 118, 123, 124, 575.9; 340/988, 990, 995, 902, 992, 993, 994; 701/200, 201, 206, 207, 209, 210, 213, 214, 300; 342/357

(56) References Cited

U.S. PATENT DOCUMENTS 5,428,544 A * 6/1995 Shyu .......................... 701/117
5,510,797 A * 4/1996 Abraham et al. ........... 342/352
5,546,311 A * 8/1996 Sekine ....................... 701/208
5,699,056 A * 12/1997 Yoshida ...................... 340/905
5,732,385 A * 3/1998 Nakayama et al. ......... 701/201
5,777,580 A * 7/1998 Janky et al. ................ 342/457
6,253,153 B1 * 6/2001 Kantani et al. ............. 701/209

FOREIGN PATENT DOCUMENTS

JP 5-266399 10/1993
JP 10-124797 5/1998
JP 10-261195 9/1998

OTHER PUBLICATIONS

Japanese Office Action dated Jul. 29, 2003 with English translation.

* cited by examiner

*Primary Examiner*—Jean Gelin
(74) *Attorney, Agent, or Firm*—Arent Fox

(57) ABSTRACT

There is provided a mobile unit communication apparatus which is to be mounted on a mobile unit to intermittently transmit an information signal of the mobile unit. The apparatus has detecting means for detecting various statuses of the mobile unit and a periphery of the mobile unit, as status data. Further, the apparatus also has transmission frequency controlling means, wherein a transmission frequency of an information signal which is intermittently transmitted is changed in accordance with the status data. Hence, in each of the mobile units, the load of processing information obtained from received radio waves can be reduced. Further, the driver can efficiently obtain adequate status information, so that the driving load on the driver can be reduced.

15 Claims, 6 Drawing Sheets

MOBILE UNIT COMMUNICATION APPARATUS

BACKGROUND OF THE INVENTION

1. Field of the Invention

The present invention relates to a mobile unit communication apparatus which performs communication between mobile units such as vehicles.

2. Description of the Related Art

A communication apparatus which performs communication between running vehicles to exchange status information of the vehicles such as a running state is disclosed in an Unexamined Japanese Patent Publication (JP-A-5-266399). Such a communication apparatus of the related art has a radio communication device, and, through the radio communication device, performs transmission of a radio signal containing status information relating to a vehicle on which the apparatus is mounted, and reception of status information relating to another vehicle. In the communication apparatus, the transmission timing is set at given predetermined time intervals. At the transmission timing, first, it is checked whether a radio wave of a predetermined communication radio frequency exists or not. If such a radio wave does not exist, transmission at the communication radio frequency is immediately performed by the radio communication device. If such a radio wave exists, transmission is performed after the radio wave no more exists.

SUMMARY OF THE INVENTION

In a dense running environment where many vehicles are running in front and rear of the own vehicle and in the opposite direction, such a conventional apparatus for inter-vehicle communication detects a radio wave of the communication radio frequency with a higher possibility as compared with the case in a non-dense running environment where few vehicles are running in front and rear of the own vehicle and in the opposite direction. In the dense running environment, therefore, a state where plural vehicles simultaneously perform transmission to cause interference or transmission is disabled even at the transmission timing is continued, so that necessary status information cannot be immediately transmitted to another vehicle. In a dense running environment where many vehicles exist around the own vehicle, as a result, there arises a problem in that status information which is necessary for each vehicle and which relates to other vehicles cannot be efficiently obtained. In such a dense running environment, the amount of information which is received from the other vehicles and which should be processed is large, and hence there arises another problem in that the processing load is increased.

These problems are similarly produced not only in vehicles but also in mobile units of other kinds such as ships.

It is an object of the invention to provide a communication apparatus for a mobile unit which, even in the case where many other mobile units exist around the mobile unit, can efficiently obtain necessary status information relating to the other mobile units.

The mobile unit communication apparatus of the invention is an apparatus to be mounted on a mobile unit to intermittently transmit an information signal of the mobile unit. The mobile unit communication apparatus comprises: detecting means for detecting various statuses of the mobile unit and a periphery of the mobile unit, as status data; and transmission frequency controlling means for changing a transmission frequency of the information signal in accordance with the status data.

According to the invention, various statuses of a mobile unit and the periphery of the mobile unit are detected as status data, and the transmission frequency of the information signal is changed in accordance with the status data. Even when many other mobile units exist around the mobile unit, therefore, it is possible to efficiently obtain necessary status information relating to the other mobile units.

DETAILED DESCRIPTION OF THE PREFERRED EMBODIMENT

Hereinafter, an embodiment of the invention will be described in detail with reference to the accompanying drawings.

Figure 1:
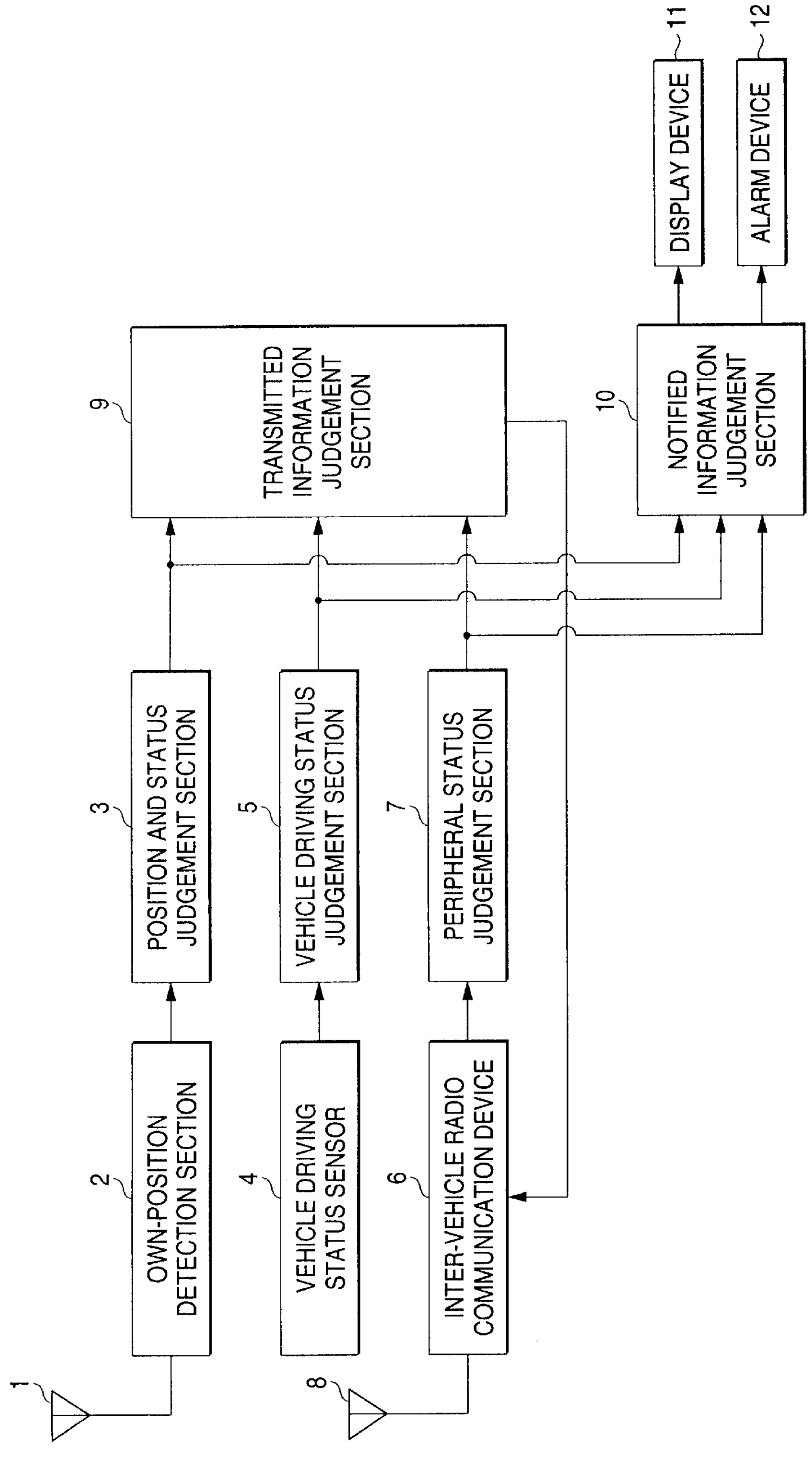
FIG. 1 is a block diagram showing an embodiment of the invention.

FIG. 1 shows a vehicle communication apparatus according to the invention. The vehicle communication apparatus is mounted on a vehicle (not shown), and comprises an own-position detection section 2, a vehicle driving status sensor 4, and an inter-vehicle radio communication device 6 which are used in an information detection unit.

The own-position detection section 2 is configured by a GPS (Global Positioning System) device connected to an antenna 1. The own-position detection section 2 receives a radio wave transmitted from an artificial satellite, through the GPS antenna 1, and detects by calculation own-position information containing the current own position and running direction, on the basis of the received signal. A position and status judgment section 3 is connected to the own-position detection section 2. The position and status judgment section 3 calculates the distance to an intersection, and the arrival time period required for arriving at the intersection (hereinafter, referred to as the intersection arrival time period), on the basis of the own-position information obtained from the own-position detection section 2. As the intersection, a first intersection in the running direction along the road to which the current own position belongs is detected from map data stored in a memory that is not shown. The distance to the intersection is calculated from the position of the intersection and the current own position.

The intersection arrival time period is calculated from the distance to the intersection, and an own-vehicle speed will be described later. The position and status judgment section 3 determines the category (a highway, a national road, a prefectural road, and the other) of the road to which the current own position belongs, from the map data.

Although not shown in the figure, the vehicle driving status sensor 4 comprises sensors such as: a speed sensor which detects the speed of the vehicle; an acceleration sensor which detects the acceleration of the vehicle; a brake switch which detects an operation of the brake; a turn indication switch which detects a turn indicating operation performed on the vehicle; a steering sensor which detects the steering amount; a yaw rate sensor which detects the inclination of the vehicle; and a throttle opening sensor which detects the opening of the throttle valve of the vehicle. A vehicle driving status judgment section 5 is connected to the output of the vehicle driving status sensor 4. The vehicle driving status judgment section 5 determines an own-vehicle running status comprising the own-vehicle speed, the course, and the running state, on the basis of sensor outputs which are obtained from the vehicle driving status sensor 4. With respect to the course, the vehicle is judged to be in one of a right turn, a left turn, and straight running. With respect to the running state, the vehicle is judged to be in one of the states, i.e., acceleration, equal speed, deceleration, and stop.

The inter-vehicle radio communication device 6 is provided for performing communication with other vehicles, and transmits and receives a radio signal through an antenna 8. An information signal is carried by the radio signal contains peripheral status data including own-vehicle information. For example, the peripheral status data include an own-vehicle ID, the current own position, the next intersection (position, identification number) along the road, an own-vehicle speed, an own-vehicle acceleration, the running direction, the course, the intersection arrival time period, and the identifications and number of destinations. A peripheral status judgment section 7 is connected to the output of the inter-vehicle radio communication device 6. On the basis of the information signals of other vehicles which have been received by the inter-vehicle radio communication device 6, the peripheral status judgment section 7 determines the configuration of the vehicles (vehicle group) which are running or stopping in the periphery of the own-vehicle position, and then the scale of the constituting vehicles, and the own order in the vehicle group. Furthermore, the peripheral status judgment section 7 determines the vehicle type, a response demand, and the frequency per unit time on the basis of the received information signals of the other vehicles. The vehicle type is judged from the vehicle category in the information signals, and the response demand is judged from the identifications and number of destinations in the information signals. The communication frequency per unit time is judged from the occupation status of radio waves of the communication radio frequency which are transmitted and received by the inter-vehicle radio communication devices 6 of the own and peripheral vehicles.

A transmitted information judgment section 9 and a notified information judgment section 10 are connected to the position and status judgment section 3, the vehicle driving status judgment section 5, and the peripheral status judgment section 7. The transmitted information judgment section 9 captures: the distance to the intersection, the intersection arrival time period, and the category of the road from the position and status judgment section 3; the own-vehicle speed, the course of the own vehicle, and the running state from the vehicle driving status judgment section 5; and the own order in the vehicle group, the scale of the vehicle group, the response demand, and the communication frequency per unit time from the peripheral status judgment section 7. The vehicle attribute of the own vehicle is previously written into an internal memory (not shown) of the transmitted information judgment section 9. The information of the own vehicle attribute is obtained from the internal memory. The own vehicle attribute indicates the category of the vehicle, such as a light automobile, an ordinary automobile, a large automobile, a special vehicle, a motorcycle, or a motorized two-wheeled vehicle. An own-vehicle information sending frequency is calculated on the basis of the captured status data. The own-vehicle information sending frequency is a frequency at which the inter-vehicle radio communication device 6 transmits an information signal containing the status data.

In the transmitted information judgment section 9, at the timing when transmission is to be performed on the basis of the own-vehicle information sending frequency, the information signal is sent to the inter-vehicle radio communication device 6 and then transmitted therefrom. In the transmission, the information signal is transmitted in the form of a radio signal of a predetermined format.

In the same manner as the transmitted information judgment section 9, the notified information judgment section 10 captures: status data such as the distance to the intersection, the intersection arrival time period, and the category of the road from the position and status judgment section 3; status data including the own-vehicle speed, the course of the own vehicle, and the running state from the vehicle driving status judgment section 5; and status data such as the speeds and courses of other vehicles in the periphery of the own vehicle from the peripheral status judgment section 7. From the captured status data, for example, the notified information judgement section 10 detects vehicles which have a dangerous relative relationship with the own vehicle in the own-vehicle position and the vicinity of the intersection, and controls a display device 11 so as to display information of the vehicles. Among such vehicles, a vehicle of a high degree of danger is notified to the driver and the fellow passenger by giving an alarm from an alarm device 12.

The position and status judgment section 3, the vehicle driving status judgment section 5, the peripheral status judgment section 7, the transmitted information judgment section 9, and the notified information judgment section 10 may be configured by a single microcomputer. The antennas 1 and 8, the own-position detection section 2, the position and status judgment section 3, the vehicle driving status sensor 4, the vehicle driving status judgment section 5, the inter-vehicle radio communication device 6, and the peripheral status judgment section 7 correspond to the detecting means, and the transmitted information judgment section 9 corresponds to the transmission frequency controlling means.

Next, a transmitted information judging operation by the transmitted information judgment section 9 will be described.

Figure 2:
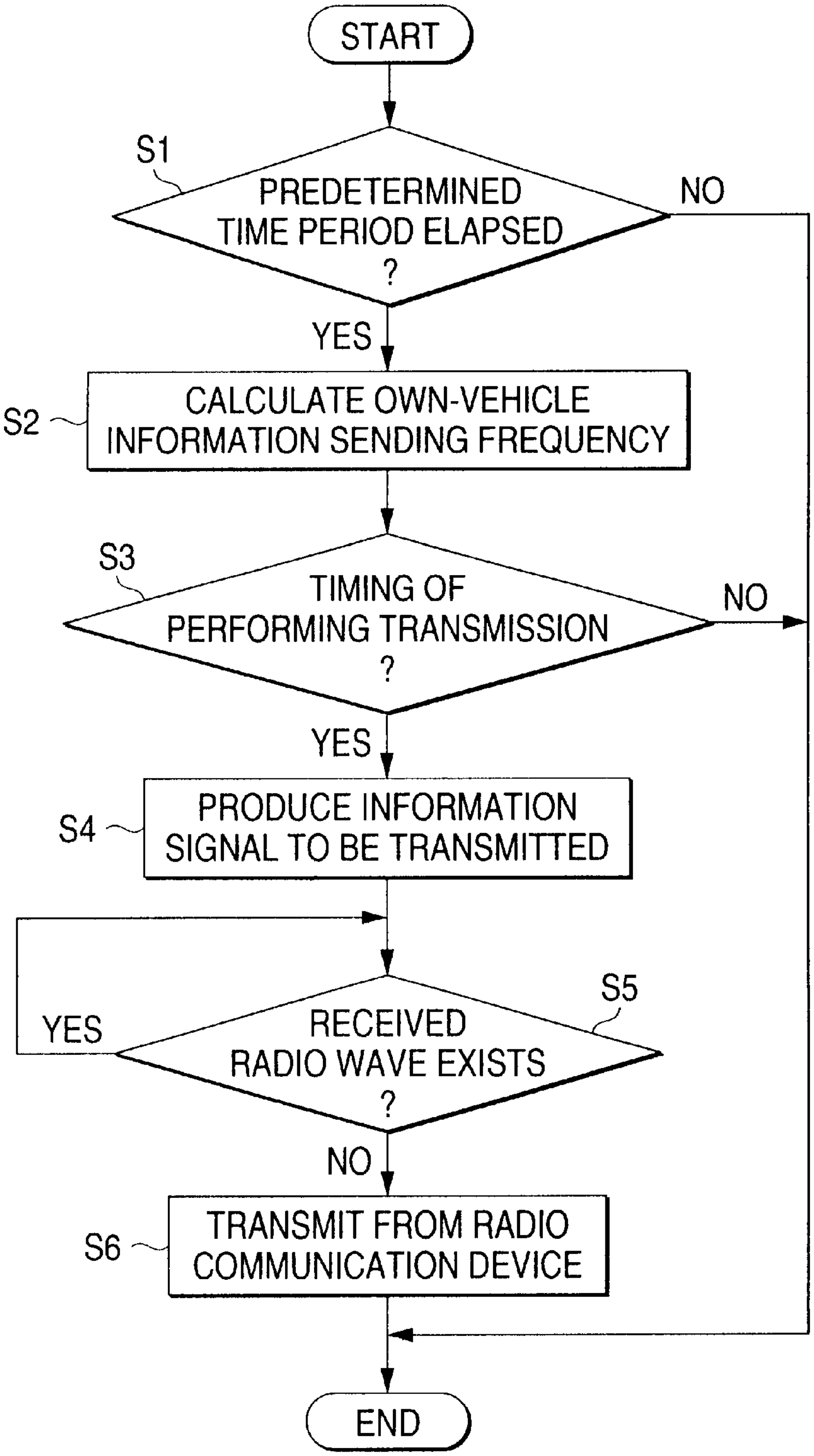
FIG. 2 is a flowchart showing the operation of a transmitted information judgment section.
Figure 3:
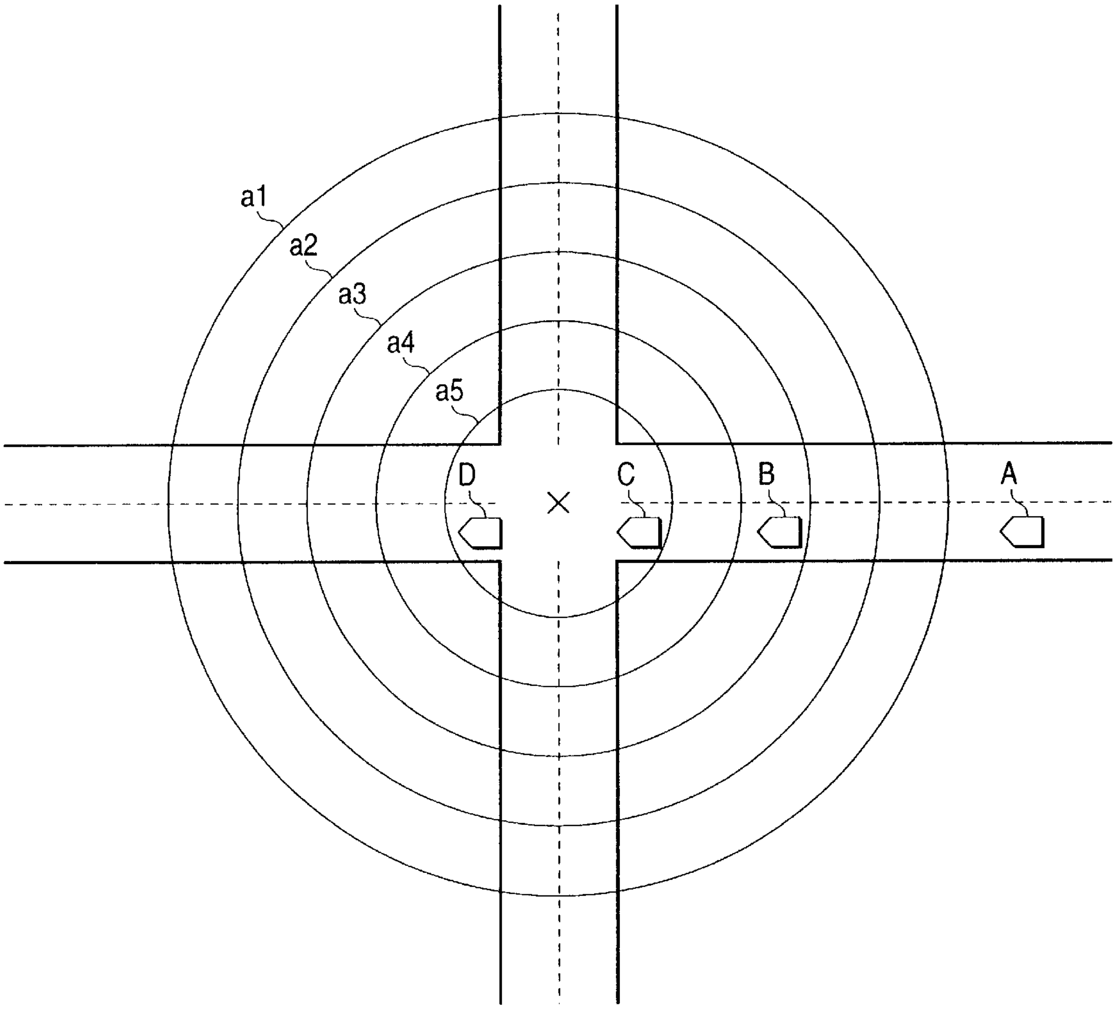
FIG. 3 is a diagram illustrating a method of setting a core relating to the distance to an intersection.

As shown in FIG. 2, the transmitted information judgment section 9 first judges whether a predetermined time period (for example, 100 msec) has elapsed or not (step S1). The judgment in step S1 is performed in order to implement the processes subsequent to step S2 at intervals of the predetermined time period. The transmitted information judgment section 9 has an internal timer (not shown). The timer repeatedly measures the predetermined time period. Therefore, an elapse of the predetermined time period can be known from a result of the measurement. If the predetermined time period has elapsed, the own-vehicle information sending frequency is calculated (step S2). The method of calculating the own-vehicle information sending frequency will be described later. In accordance with the calculated own-vehicle information sending frequency and the time period which has elapsed after the previous transmission, it is judged whether the present timing coincides with the timing of actually performing transmission or not (step S3). The own-vehicle information sending frequency is calculated as the number of transmissions is to be performed during, for example, 1 sec. When the transmission number is set to 10, therefore, transmission is performed at intervals of 100 msec. When the time period corresponding to the calculated own-vehicle information sending frequency has elapsed, an information signal to be transmitted is produced in the above-mentioned predetermined format (step S4). After the information signal is produced, it is judged whether a received radio wave exists or not (step S5). This judgment is conducted based on the level of a signal received by the inter-vehicle radio communication device 6. If the received signal level is higher than a given level, it is judged that a received radio wave exists, and the judgment in step S5 is repeated. By contrast, if the received signal level is not higher than a given level, it is judged that a received radio wave does not exist, and the information signal is superimposed onto a carrier signal and then transmitted from the inter-vehicle radio communication device 6 (step S6).

After step 6 is implemented, the control returns to step S1 to repeat the above-described operation.

Next, the calculation of the own-vehicle information sending frequency in step S2 will be described.

In the transmitted information judgment section 9, as shown in Table 1, judgment criteria, degrees, and weighting coefficients for each of the status data are stored in the internal memory in the form of a data table. A degree corresponding to an obtained status data is set on the basis of the judgement criteria, and the set degree is used as a score.

TABLE 1

| Kinds of status data | Judgment criteria | Degrees | Weighting coefficient |
|---|---|---|---|
| Distance to intersection | a1 (m) or longer | a-1 | w1 |
| | a2~a1 (m) | a-2 | |
| | a3~a2 (m) | a-3 | |
| | a4~a3 (m) | a-4 | |
| | a5~a4 (m) | a-5 | |
| | a6~a5 (m) | a-6 | |
| | 0~−a1 (m) | a-7 | |
| Intersection arrival time period | b1 (sec) or longer | b-1 | w2 |
| | b2~b1 (sec) | b-2 | |
| | b3~b2 (sec) | b-3 | |
| | b3 (sec) or shorter | b-4 | |
| Speed | c1 (km/h) or higher | c-1 | w3 |
| | c2~c1 (km/h) | c-2 | |
| | c3~c2 (km/h) | c-3 | |
| | c4~c3 (km/h) | c-4 | |
| | c4 (km/h) or lower | c-5 | |
| Course | right turn | d-1 | w4 |
| | left turn | d-2 | |
| | Straight running | d-3 | |
| running state | Acceleration | e-1 | w5 |
| | equal speed | e-2 | |
| | Deceleration | e-3 | |
| | Stop | e-4 | |

TABLE 1-continued

| Kinds of status data | Judgment criteria | Degrees | Weighting coefficient |
|---|---|---|---|
| Vehicle attribute | Category 1 | f-1 | w6 |
| | Category 2 | f-2 | |
| | Category 3 | f-3 | |
| | Category 4 | f-4 | |
| | Category 5 | f-5 | |
| own order in vehicle group | Lead | g-1 | w7 |
| | Intermediate | g-2 | |
| | Tail | g-3 | |
| scale of vehicle group | Large | h-1 | w8 |
| | Medium | h-2 | |
| | Small | h-3 | |
| | Single | h-4 | |
| Response demand | Designation | i-1 | w9 |
| | Existence | i-2 | |
| | designation of communication target | i-3 | |
| | Nothing | i-4 | |
| category of road | Highway | j-1 | w10 |
| | National road | j-2 | |
| | Prefectural road | j-3 | |
| | Other | j-4 | |
| Communication frequency per unit time | k1 (%) or larger | k-1 | w11 |
| | k2 ~k1 (%) | k-2 | |
| | k3~k2 (%) | k-3 | |
| | k4~k3 (%) | k-4 | |
| | k4 (%) or smaller | k-5 | |

In the case of the distance to the intersection, for example, regions of a1 (m) or longer, a2 to a1 (m), a3 to a2 (m), a4 to a3 (m), a5 to a4 (m), 0 to a5 (m), and 0 to −a1 (m) are previously set as the judgement criteria. In correspondence with the judgement criteria, a-1 to a-7 are set as the degrees. The size relationships among the degrees are set to be a-7<a-1<a-2<a-3<a-4<a-5<a-6. When the transmitted information judgment section 9 obtains information of the distance to the intersection from the position and status judgment section 3, one of the regions which are classified as the judgement criteria is judged as the region to which the obtained distance to the intersection belongs. The degree corresponding to a result of the judgment is set as a score α1. When the own vehicle advancing to a predetermined position X in an intersection is running at a position A as shown in FIG. 4, the distance to the intersection is not shorter than a1 (m), and hence the score α1 is set to a-1. When the own vehicle further advances from the position A to a position B, the distance to the predetermined position X is a 3 to a 4 (m), and hence the score α1 is set to a-4. When the own vehicle reaches a position C which is immediately before the predetermined position X, the distance to the predetermined position X is a5 to 0 (m), and hence the score a1 is set to the maximum value or a-6. By contrast, when the own vehicle has passed the predetermined position X and then reaches a position D, the distance to the predetermined position X is 0 to −a1 (m), and hence the score α1 is set to the minimum value or a-7.

With respect to the intersection arrival time period at a predetermined position in the intersection, similarly, regions of b1 (sec) or longer, b2 to b1 (sec), b3 to b2 (sec), and b3 (sec) or shorter are previously set as the judgement criteria. In correspondence with the judgement criteria, b-1 to b-4 are set as the degrees. The size relationships among the degrees are set to be b-1<b-2<b-3<b-4 so that the degree is higher as the intersection arrival time period is shorter. When the transmitted information judgment section 9 obtains information of the intersection arrival time period from the position and status judgment section 3, one of the regions which are classified as the judgement criteria is judged as the region to which the obtained intersection arrival time period belongs. The degree corresponding to a result of the judgment is set as a score $\alpha 2$.

With respect to the speed of the own-vehicle, similarly, regions of c1 (km/h) or higher, c2 to c1 (km/h), c3 to c2 (km/h), c4 to c3 (km/h), and c4 (km/h) or lower are previously set as the judgement criteria. In correspondence with the judgement criteria, c-1 to c-5 are set as the degrees. The size relationships among the degrees are set to be c-1>c-2>c-3>c-4>c-5 so that the degree is higher as the speed is higher. When the transmitted information judgment section 9 obtains information of the speed from the vehicle driving status judgment section 5, one of the regions which are classified as the judgement criteria is judged as the region to which the obtained speed belongs. The degree corresponding to a result of the judgment is set as a score $\alpha 3$.

Figure 4A:
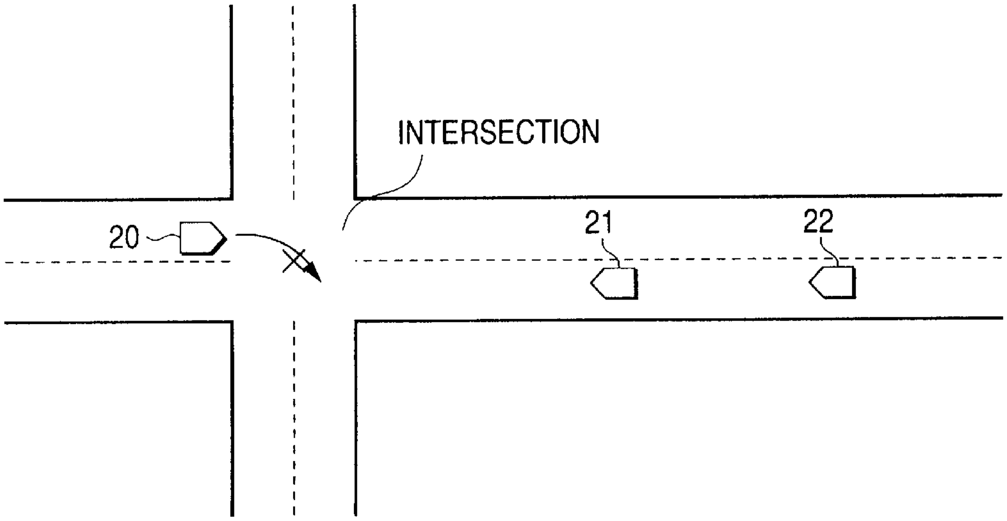
FIG. 4A is a diagram illustrating a method of setting score relating to the course in the left-hand traffic.

Next, the course will be described. As seen from Table 1, a degree d-1 is allocated to a right turn, a degree d-2 to a left turn, and a degree d-3 to straight running. The size relationships among the degrees are set to be d-1>d-2>d-3. When, as shown in FIG. 4A, the own vehicle 20 is at a position which is immediately before a predetermined position X in an intersection and tries to turn to the right as indicated by the arrow, for example, the degree d-1 is set as a score $\alpha 4$. The higher degree is allocated to a right turn because of the following reason. In the case of a right turn, the possibility that the own vehicle collides with an oncoming vehicle 21 or 22 is higher, and the necessity of giving the information of a right turn to the oncoming vehicles 21 and 22 is therefore greater. The above is applicable to the case of the left-hand traffic.

Figure 4B:
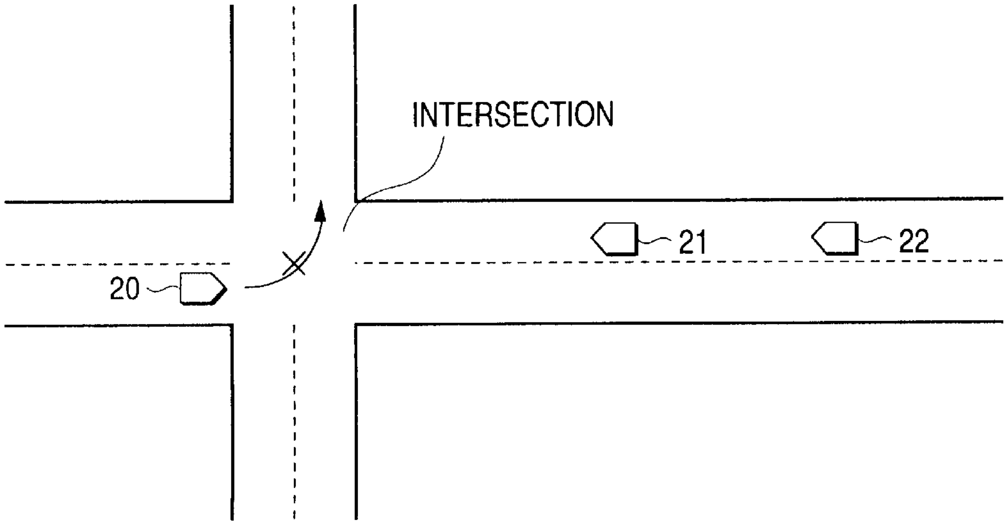
FIG. 4B is a diagram illustrating a method of setting score relating to the course in the right-hand traffic.

On the other hand, in the case of the right-hand traffic such as U.S.A. or Europe, the possibility that the own vehicle collides with an oncoming vehicle 21 or 22 is higher as shown in FIG. 4B, and the necessity of giving the information of a left turn to the oncoming vehicles 21 and 22 is therefore greater. Hence, the size relationships among the degrees are set to be d-2>d-1>d-3. The other arrangements as well as operation and advantages are similar to those of the left-hand traffic.

With respect to the running state of the own-vehicle, similarly, acceleration, equal speed, deceleration, and stop are previously set as the judgement criteria. In correspondence with the judgement criteria, e-1 to e-4 are set as the degrees. The size relationships among the degrees are set to be e-1>e-2>e-3>e-4 so that the degree is higher in a running state where the speed is raised. When the transmitted information judgment section 9 obtains information of the running state from the vehicle driving status judgment section 5, one of the regions of acceleration, equal speed, deceleration, and stop which are classified as the judgement criteria is judged as the region to which the obtained running state belongs. The degree corresponding to a result of the judgment is set as a score $\alpha 5$.

With respect to the vehicle attribute of own-vehicle, categories 1 to 5 are previously set as the judgement criteria. In correspondence with the judgement criteria, f-1 to f-5 are set as the degrees. The size relationships among the degrees are set to be f-1>f-2>f-3>f-4>f-5 so that, for example, the degree is higher for a vehicle category which can run at a higher speed. When the transmitted information judgment section 9 obtains information of the vehicle attribute from the internal memory, one of the regions of categories 1 to 5 which are classified as the judgement criteria is judged as the region to which the obtained vehicle attribute belongs. The degree corresponding to a result of the judgment is set as a score $\alpha 6$.

With respect to the own order in the vehicle group, a lead one, an intermediate one, and a tail one are previously set as the judgement criteria. In correspondence with the judgement criteria, g-1 to g-3 are set as the degrees. For example, the size relationships among the degrees are set to be g-1>g-2>g-3. When the transmitted information judgment section 9 obtains information of the own order in the vehicle group from the peripheral status judgment section 7, one of the regions of the lead one, the intermediate one, and the tail one which are classified as the judgement criteria is judged as the region to which the own order belongs. The degree corresponding to a result of the judgment is set as a score $\alpha 7$.

With respect to the scale of the vehicle group, large, medium, small, and single are previously set as the judgement criteria. In correspondence with the judgement criteria, h-1 to h-4 are set as the degrees. The size relationships among the degrees are set to be h-1>h-2>h-3>h-4. As the scale of the vehicle group is larger, for example, the degree is higher. When the transmitted information judgment section 9 obtains information of the scale of the vehicle group from the peripheral status judgment section 7, one of the regions of large, medium, small, and single which are classified as the judgement criteria is judged as the region to which the scale of the vehicle group belongs. The degree corresponding to a result of the judgment is set as a score $\alpha 8$.

With respect to the response demand, designation, existence, designation of communication target, and nothing are previously set as the judgement criteria. In correspondence with the judgement criteria, i-1 to i-4 are set as the degrees. The size relationships among the degrees are set to be i-1>i-2>i-3>i-4 so that, when the response demand is issued to a specific destination, for example, the degree is higher. When the transmitted information judgment section 9 obtains information of the response demand from the peripheral status judgment section 7, one of the regions of designation, existence, designation of communication target, and nothing which are classified as the judgement criteria is judged as the region to which the obtained response demand belongs. The degree corresponding to a result of the judgment is set as a score $\alpha 9$.

With respect to the category of the road, a highway, a national road, a prefectural road, and the other are previously set as the judgement criteria. In correspondence with the judgement criteria, j-1 to j-4 are set as the degrees. The size relationships among the degrees are set to be j-1>j-2>j-3>j-4 so that the degree is higher for the road category in which a vehicle can run at a higher speed. When the transmitted information judgment section 9 obtains information of the category of the road from the position and status judgment section 3, one of the regions of a highway, a national road, a prefectural road, and the other which are classified as the judgement criteria is judged as the region to which the obtained category of the road belongs. The degree corresponding to a result of the judgment is set as a score $\alpha 10$. In the case of the category of the road, even for the same road category, the size relationships among the degrees are varied depending on the road condition. Therefore, it is not always that a higher degree is set for a highway in which a vehicle can run at a higher speed.

Figure 5A:
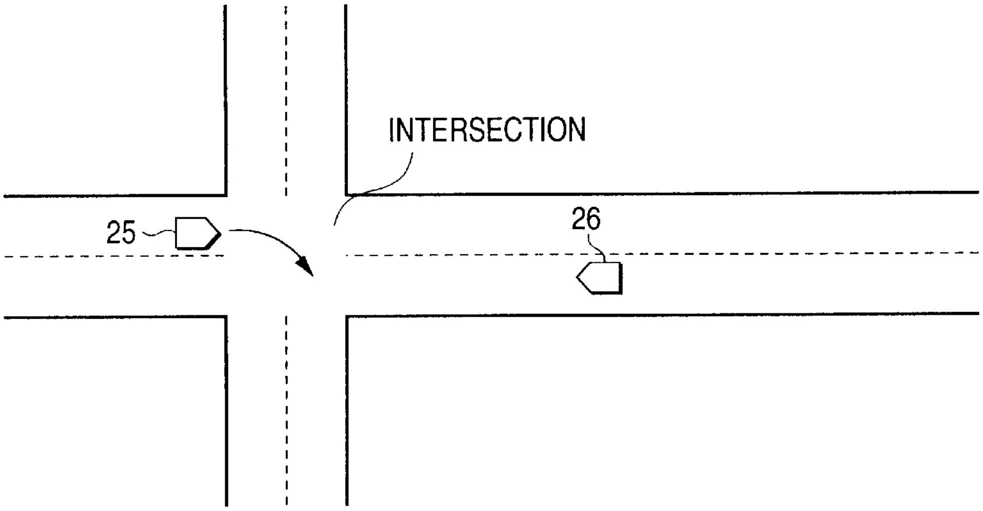
FIG. 5A is a diagram illustrating a method of setting a score relating to the communication frequency per unit time in the left-hand and not crowded traffic.
Figure 5B:
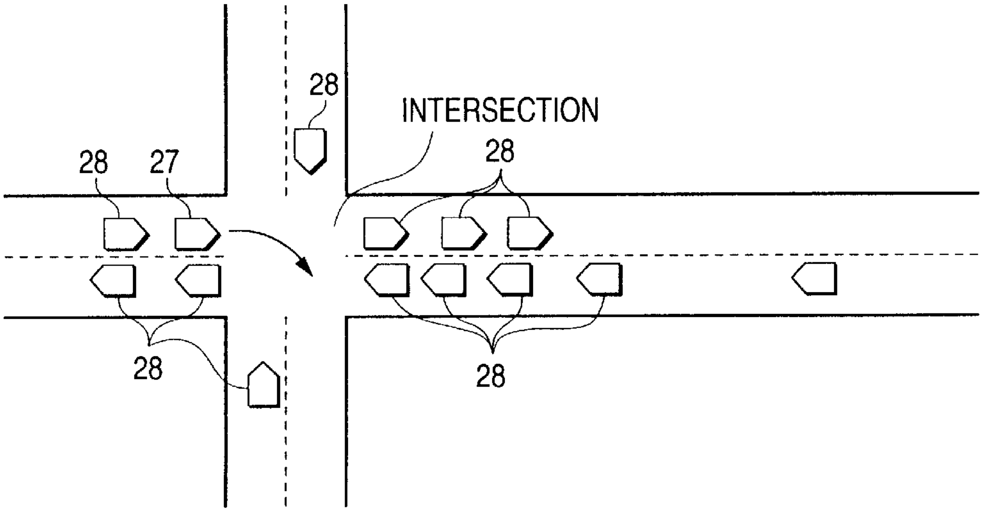
FIG. 5B is a diagram illustrating a method of setting a score relating to the communication frequency per unit time in the left-hand and crowded traffic.
Figure 5C:
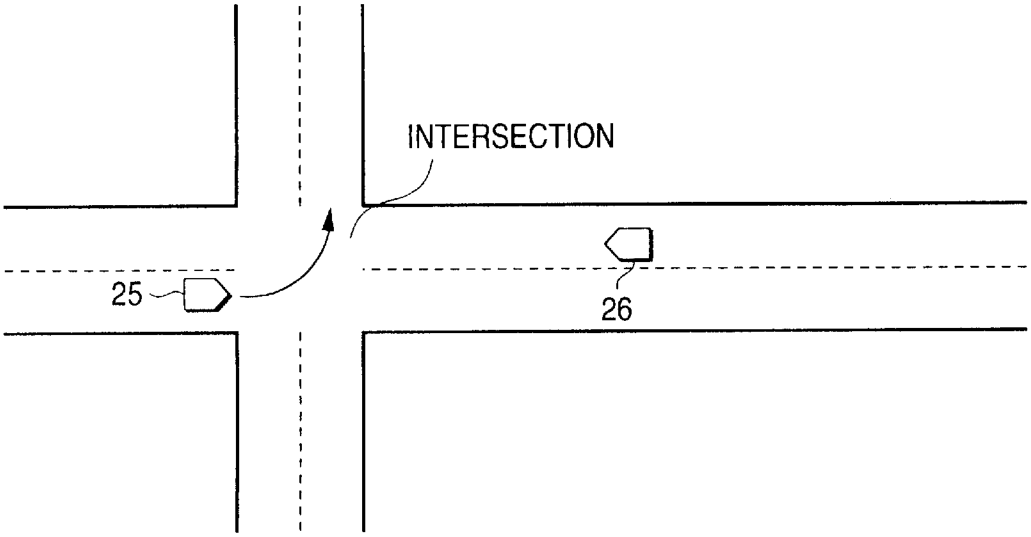
FIG. 5C is a diagram illustrating a method of setting a score relating to the communication frequency per unit time in the right-hand and not crowded traffic.
Figure 5D:
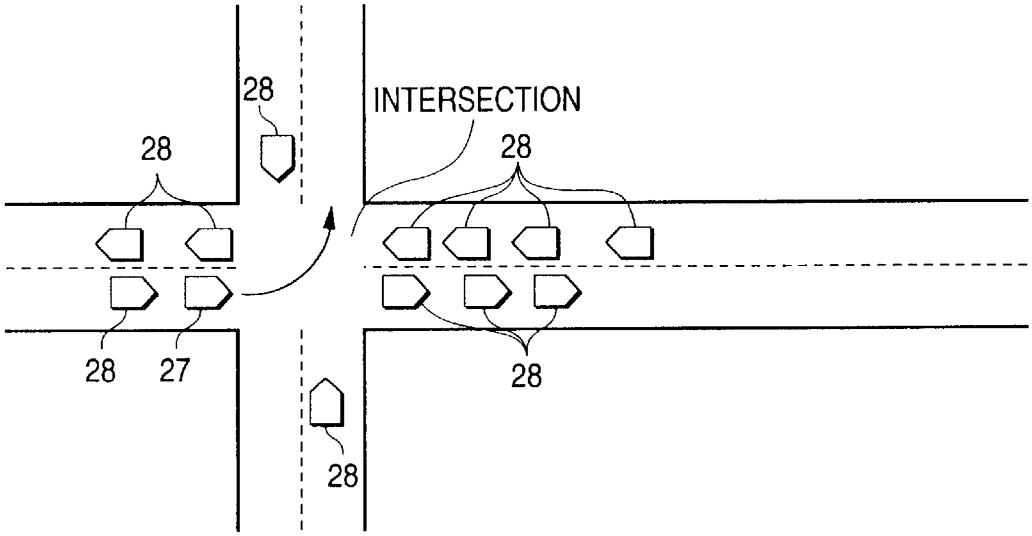
FIG. 5D is a diagram illustrating a method of setting a score relating to the communication frequency per unit time in the right-hand and crowded traffic.

With respect to the communication frequency per unit time, for example, regions of k1 (%) or larger, k1 to k2 (%), k2 to k3 (%), k3 to k4 (%), and k4 (%) or smaller are previously set as the judgement criteria. In correspondence with the judgement criteria, k-1 to k-5 are set as the degrees. The size relationships among the degrees are set to be k-1 < k-2 < k-3 < k-4 < k-5. In the case where only another vehicle 26 is running in the periphery of the own vehicle 25 as shown in FIG. 5A or 5C (the case of the right-hand traffic) therefore, inter-vehicle communication is scarcely performed, and hence the usage rate of the communication radio frequency is low, so that the communication frequency per unit time is lowered. When the communication frequency per unit time is k4 (%) or smaller, for example, a score $\alpha$11 is set to the maximum value or k-5. By contrast, in the case where many other vehicles 28 are running in the periphery of the own vehicle 27 as shown in FIG. 5B or 5D (the case of the right-hand traffic), inter-vehicle communication is frequently performed, and hence the usage rate of the communication radio frequency is high, so that the communication frequency per unit time is raised. When the communication frequency per unit time is k1 (%) or larger, for example, the score $\alpha$11 is set to the minimum value or k-1. In the case where there are many vehicles as shown in FIG. 5B, transmission is restricted in order to prevent the vehicles from simultaneously transmitting a radio wave, and hence the transmission efficiency is lowered. Namely, even when the communication apparatus has completed preparation for transmission from the own vehicle and enters the transmission waiting state, transmission cannot be immediately performed, and hence it is impossible to transmit latest information of the own vehicle to the other vehicles. In order to avoid such a phenomenon, the score $\alpha$11 is set so that the transmission frequencies of the vehicles are lowered when the usage rate of the radio frequency is high.

When the scores $\alpha$1 to $\alpha$11 for the information items are set, the transmitted information judgment section 9 reads out weighting coefficients w1 to w11 for the information items from the internal memory, and calculates the transmission frequency of the own-vehicle information in the following manner. In the following expression, $\beta$ is a constant which is determined in accordance with the importance of the system, and the like. Among a vehicle automatic control system ($\beta=\beta1$), an alarm system ($\beta=\beta2$), and an information providing system ($\beta=\beta3$), for example, the size relationships are set to be $\beta1>\beta2>\beta3$. Transmission frequency of own-vehicle information=$(\alpha1\cdot w1+\alpha2\cdot w2+\alpha3\cdot w3+ \ldots\ldots +\alpha9\cdot w9+\alpha10\cdot w10+\alpha11\cdot w11)\beta$ The thus calculated transmission frequency of the own-vehicle information is used in the judgment of step S3 on whether the present timing coincides with the timing when transmission is to be performed, or not.

In the invention, the transmission frequency is set by weighting the status data in different manners according to the kinds of the status data, and summing results of the weighting operations. Therefore, a transmission frequency which is suitable for a mobile unit and the status of the periphery of the mobile unit can be accurately obtained.

In the embodiment described above, the own-vehicle information sending frequency is determined in accordance with the status data shown in Table 1. In the invention, status data are not restricted to them, and the own-vehicle information sending frequency may be determined in accordance with status data to which other status data are added.

In the embodiment, the mobile unit communication apparatus is mounted on a vehicle. The invention can be applied not only to an apparatus for a vehicle but also that for a mobile unit of another kind such as a ship.

It is apparent to those skilled in the art that the invention can be applied not only to a communication apparatus having both receiving and transmitting functions as in the case of the embodiment, but also to that having only a transmitting function.

As described above, according to the mobile unit communication apparatus of the invention, various statuses of a mobile unit and the periphery of the mobile unit are detected as status data, and the transmission frequency of an information signal is changed in accordance with the status data. Even when many other mobile units exist around the mobile unit, therefore, it is possible to efficiently obtain necessary status information relating to the other mobile units.

When many other mobile units exist around the mobile unit, the transmission frequency of each of the mobile units can be lowered. In each of the mobile units, consequently, the load of processing information obtained from received radio waves can be reduced.

As a result, the driver can efficiently obtain adequate status information, and hence the driving load on the driver can be reduced.

What is claimed is:

1. A mobile unit communication apparatus installed in a mobile unit comprising:

- a detecting means for detecting status information of said mobile unit and peripheral information of a subject in periphery of or external to said mobile unit, both as status data; and
- score generating means for generating a plurality of scores based on said status data; and
- a transmission frequency controlling means for changing a transmission frequency of information signals in accordance with a sum of said plurality of scores based on said status data, wherein said information signals are intermittently transmitted.

2. The mobile unit communication apparatus according to claim 1, wherein the mobile unit is a vehicle.

3. The mobile unit communication apparatus according to claim 2, comprising:

- an own-position detection section being configured by a GPS device connected to an antenna, for receiving a radio wave transmitted from an artificial satellite and to detect own-position information;
- a position and status judgment section connected to said own-position detection section, for calculating a distance and an arrival time period to a predetermined position of an intersection on the basis of said own-position detection section;
- a vehicle driving status sensor;
- a vehicle driving status judgment section connected to said vehicle driving sensor, for determining own-vehicle running status on the basis of sensor outputs, said sensor outputs being obtained from said vehicle driving status sensor;
- an inter-vehicle radio communication device for transmitting and receiving said information signals via said antenna;
- a peripheral status judgement section connected to an output of said inter-vehicle radio communication device, for determining peripheral status data on the basis of said information signals of other vehicles, said information signals being received by said inter-vehicle radio communication device;
- a transmitted information judgement section for calculating an own-vehicle information sending frequency; and
- a notified information judgement section for detecting vehicles having a dangerous relative relationship with said own vehicle, and controlling a display device to display information of said vehicles.

4. The mobile unit communication apparatus according to claim 3, wherein said own-vehicle running status comprising at least an own vehicle speed, a course or a running state.

5. The mobile unit communication apparatus according to claim 3, wherein said peripheral status data comprising at least one of a vehicle type, a response demand, and a sending frequency per unit time.

6. The mobile unit communication apparatus according to claim 2, wherein said status data includes at least one of data of:

(1) Distance from an own vehicle to a predetermined position in an intersection;

(2) intersection arrival time period;

(3) speed of said own vehicle;

(4) course of said own vehicle;

(5) running state of said own vehicle;

(6) vehicle attribute of said own vehicle;

(7) own vehicle's order in vehicle group;

(8) scale of vehicle group;

(9) response demand;

(10) category of road; and

(11) communication frequency per unit time.

7. The method for transmitting information signals of a mobile unit according to claim 1, wherein said mobile unit information sending frequency is calculated as the number of transmissions is to be performed during a time being set up at will.

8. A mobile unit communication apparatus installed in a mobile unit comprising:

a detecting means for detecting various statuses of said mobile unit and a periphery of said mobile unit, as status data; and a transmission frequency controlling means for changing a transmission frequency of information signals in accordance with said status data, wherein said information signals are intermittently transmitted;

means for judging whether or not a predetermined time period for transmitting the information signal is elapsed;

means for calculating a mobile unit information sending frequency based on said status data when said predetermined time period is elapsed;

means for judging whether or not the information signal is transmitted based on the mobile unit information sending frequency and a time period, said time period being elapsed after the previous transmission;

means for producing the information signal to be transmitted at predetermined time period corresponding to the mobile unit information sending frequency;

means for judging whether or not a received radio wave from other mobile unit exists; and means for transmitting said information signal when no received radio wave exists in said means for judging existence of said received wave, wherein the mobile unit is a vehicle.

9. The mobile unit communication apparatus according to claim 8, wherein said step of calculating a mobile unit information sending frequency further comprising:

means for reading a judgment criteria according to said status data;

means for reading a degree according to said judgment criteria; and means for reading a weighting coefficient for calculating said own-vehicle information sending frequency according to said judgment criteria, wherein said judgment criteria, said degree and said weighting coefficient are stored in the form of a data table according to a status data.

10. A method for transmitting information signals of a mobile unit comprising a steps of:

(a) judging whether or not a predetermined time period for transmitting the information signal is elapsed;

(b) calculating a mobile unit information sending frequency based on a status data when said predetermined time period is elapsed;

(c) judging whether or not the information signal is transmitted based on the mobile unit information sending frequency and a time period elapsed after the previous transmission;

(d) producing the information signal to be transmitted at predetermined time period corresponding to the mobile unit information sending frequency;

(e) judging whether or not a received radio wave from other mobile unit exists; and (f) transmitting said information signal when no received radio wave exists in said judging step for an existence of said received wave.

11. The method for transmitting information signals of a mobile unit according to claim 10, a mobile unit is a vehicle.

12. The method for transmitting information signals of a mobile unit according to claim 10, wherein said calculating step for a mobile unit information sending frequency further includes a step of:

reading a judgment criteria according to said status data;

reading a degree according to said judgment criteria; and reading a weighting coefficient for calculating said own-vehicle information sending frequency according to said judgment criteria, wherein said judgment criteria, said degree and said weighting coefficient are stored in the form of a data table according to a status data.

13. The method for transmitting information signals of a mobile unit according to claim 10, wherein said mobile unit information sending frequency is calculated as the number of transmissions is to be performed during a time being set up at will.

14. The method for transmitting information signals of a mobile unit according to claim 10, wherein said status data includes at least one of data of:

(1) Distance from an own vehicle to a predetermined position in an intersection;

(2) Intersection arrival time period;

(3) Speed of said own vehicle;

(4) Course of said own vehicle;

(5) Running state of said own vehicle;

(6) Vehicle attribute of said own vehicle;

(7) Own vehicle's order in vehicle group;

(8) Scale of vehicle group;

(9) Response demand;

(10) Category of road; and

(11) Communication frequency per unit time.

15. A mobile unit communication apparatus installed in a mobile unit comprising:

a status detector for detecting status information of said mobile unit and peripheral information of a subject in periphery of or external to said mobile unit, both as status data;

a score generator for generating a plurality of scores based on said status data; and a transmission frequency controller for changing the elapsed time between transmission of information signals based on a sum of said plurality of scores.

* * * * *